United States Patent
Gropper

(10) Patent No.: US 8,698,640 B1
(45) Date of Patent: Apr. 15, 2014

(54) MONITORED WEATHER AND EMERGENCY ALERT SYSTEM

(76) Inventor: Daniel R. Gropper, Vienna, VA (US)

( * ) Notice: Subject to any disclaimer, the term of this patent is extended or adjusted under 35 U.S.C. 154(b) by 521 days.

(21) Appl. No.: 12/932,726

(22) Filed: Mar. 4, 2011

Related U.S. Application Data

(60) Provisional application No. 61/339,382, filed on Mar. 4, 2010.

(51) Int. Cl.
*G08B 1/08* (2006.01)
*G01W 1/00* (2006.01)
*G08B 9/00* (2006.01)
*G06F 15/16* (2006.01)

(52) U.S. Cl.
USPC .......... 340/601; 340/539.1; 340/539.16; 340/286.02; 455/404.1; 702/3; 709/219; 709/231

(58) Field of Classification Search
None
See application file for complete search history.

(56) References Cited

U.S. PATENT DOCUMENTS

| | | |
|---|---|---|
| 5,444,433 A | 8/1995 | Gropper |
| 5,574,999 A | 11/1996 | Gropper |
| 5,781,852 A | 7/1998 | Gropper |
| 5,917,887 A * | 6/1999 | Fesler et al. ............. 379/48 |
| 6,323,767 B1 | 11/2001 | Gropper |
| 7,802,173 B2 | 9/2010 | Chan et al. |
| 7,873,344 B2 | 1/2011 | Bowser et al. |
| 7,953,825 B2 * | 5/2011 | Marshall et al. ............. 709/219 |
| 8,427,308 B1 * | 4/2013 | Baron et al. ............. 340/539.3 |
| 8,489,063 B2 * | 7/2013 | Petite ............. 455/404.1 |
| 2007/0207771 A1 * | 9/2007 | Bowser et al. ............. 455/404.1 |
| 2007/0288650 A1 * | 12/2007 | Marshall et al. ............. 709/231 |
| 2007/0296575 A1 * | 12/2007 | Eisold et al. ............. 340/539.16 |
| 2008/0034114 A1 * | 2/2008 | Ducey et al. ............. 709/238 |
| 2008/0085695 A1 * | 4/2008 | Vare et al. ............. 455/404.1 |
| 2009/0181639 A1 * | 7/2009 | Glanton ............. 455/404.1 |
| 2011/0181408 A1 * | 7/2011 | Greenis et al. ............. 340/539.1 |
| 2012/0013451 A1 * | 1/2012 | Casey et al. ............. 340/286.02 |

* cited by examiner

*Primary Examiner* — Julie Lieu
(74) *Attorney, Agent, or Firm* — Daniel R Gropper

(57) ABSTRACT

A system for a monitored weather alert is provided. Weather and weather alert information comes from many sources and is consolidated by a remote computer and is output and displayed on printers, signboards, email, web site and other means of communication including flat screens and mobile telephones. Each set in the process of acquiring, analyzing, displaying and distributing the information is monitored and diagnostics are provided. Status on each element of the system is consolidated, analyzed and displayed and distributed to provide for the best possible reliability of the system and the best means for troubleshooting the system.

45 Claims, 11 Drawing Sheets

FIG.8

UMW VA File and Data Status

[Refresh Tables] [Clear Tables]

| File Description | File Name | Server DTS or File Update Time | Time Span or Error | | Analysis |
|---|---|---|---|---|---|
| TxWx Data File | UMWVATxWxStatus1.xml | 3/2/2011 12:14:37 PM | Days:0 Hours:0 Min:0 Sec:8 | | OK |
| National Radar File | usa_anim.gif | 3/2/2011 12:11:10 PM | Days:0 Hours:0 Min:3 Sec:35 | | OK |
| Local Radar File | Time_01.gif | 12/31/1600 7:00:00 PM | Days:149809 Hours:17 Min:14 Sec:46 | | Check Local Radar Update Time |
| TxWx Summary | TxWx Data Status | 3/2/2011 12:14:46 PM | [*-*-* 3/2/2011 12:14PM-*-*TxWx Time-*-12:13-*TxWx Time Needs Correction -*-*] | | TxWx Error |

| CustName | Location | Device | Port | Device | Server DTS or File Update | Item | Reading | High Limit | Low Limit | Analysis |
|---|---|---|---|---|---|---|---|---|---|---|
| Winnebago IL | Rockford IL | TxWx | 12004 | 3/2/2011 12:14 PM | 3/2/2011 12:14 PM | Time of Obs (Server) | 11:14:37 AM | not blank | not blank | OK |
| Winnebago IL | Rockford IL | TxWx | 12004 | 3/2/2011 12:14 PM | 3/2/2011 12:14 PM | Date | Wednesday, March 02, 2011 | not blank | not blank | OK |
| Winnebago IL | Rockford IL | TxWx | 12004 | 3/2/2011 12:14 PM | 3/2/2011 12:14 PM | WindDir | E | | | OK |
| Winnebago IL | Rockford IL | TxWx | 12004 | 3/2/2011 12:14 PM | 3/2/2011 12:14 PM | WindSpeed | 11 | 0 | 75 | OK |
| Winnebago IL | Rockford IL | TxWx | 12004 | 3/2/2011 12:14 PM | 3/2/2011 12:14 PM | Solar | Bright Sun – 150 | not blank | not blank | OK |
| Winnebago IL | Rockford IL | TxWx | 12004 | 3/2/2011 12:14 PM | 3/2/2011 12:14 PM | Temp Inside | 071 | 0 | 100 | OK |
| Winnebago IL | Rockford IL | TxWx | 12004 | 3/2/2011 12:14 PM | 3/2/2011 12:14 PM | Temp Outside | 024 | 0 | 100 | OK |
| Winnebago IL | Rockford IL | TxWx | 12004 | 3/2/2011 12:14 PM | 3/2/2011 12:14 PM | Humidity | 042% | 0 | 100 | OK |
| Winnebago IL | Rockford IL | TxWx | 12004 | 3/2/2011 12:14 PM | 3/2/2011 12:14 PM | Barometer | 30.53R" | 25 | 32 | OK |
| Winnebago IL | Rockford IL | TxWx | 12004 | 3/2/2011 12:14 PM | 3/2/2011 12:14 PM | PrecipDay | 00.00" | 0 | 5 | OK |
| Winnebago IL | Rockford IL | TxWx | 12004 | 3/2/2011 12:14 PM | 3/2/2011 12:14 PM | PrecipMth | 00.00" | 0 | 20 | OK |
| Winnebago IL | Rockford IL | TxWx | 12004 | 3/2/2011 12:14 PM | 3/2/2011 12:14 PM | PrecipRate | 00.00"/hr | 0 | 5 | OK |
| Winnebago IL | Rockford IL | TxWx | 12004 | 3/2/2011 12:14 PM | 3/2/2011 12:14 PM | Current Lightning Count | 0000 | 0 | 100 | OK |
| Winnebago IL | Rockford IL | TxWx | 12004 | 3/2/2011 12:14 PM | 3/2/2011 12:14 PM | Max Lightning Count Current Hr | 0000 | 0 | 100 | OK |
| Winnebago IL | Rockford IL | TxWx | 12004 | 3/2/2011 12:14 PM | 3/2/2011 12:14 PM | Time Max Lightning Count | 00:00 | not blank | not blank | OK |
| Winnebago IL | Rockford IL | TxWx | 12004 | 3/2/2011 12:14 PM | 3/2/2011 12:14 PM | SolarMax | Bright Sun – 150 @ 12:02 | not blank | not blank | OK |
| Winnebago IL | Rockford IL | TxWx | 12004 | 3/2/2011 12:14 PM | 3/2/2011 12:14 PM | Outside TempMin | 015 F @ 08:36 | 0 | 100 | OK |

FIG. 11

MONITORED WEATHER AND EMERGENCY ALERT SYSTEM

RELATED APPLICATION INFORMATION

This application is a continuation-in-part of provisional patent application Ser. No. 61/339,382 which was filed on Mar. 4, 2010.

FIELD OF THE INVENTION

The present invention generally concerns a monitored weather and emergency alert system. This invention relates to a system used to acquire, process and distribute weather and emergency alert information using many efficient monitoring systems to ensure that the systems are fully operational when they are needed and provide multiple methods for critical alert messages to be received by end users.

BACKGROUND OF THE INVENTION

Weather and emergency alerts are issued to advise the public of time critical emergency alerts in time for them to take the best possible actions to protect life and property. The systems to accomplish the reception and distribution of alert messages can be as simple as a VHF analog radio, to as complex as an offsite server based messaging system.

The instant invention teaches many monitoring systems that keep users of the system automatically appraised of the instantaneous status and reliability of the system, as well as methods to provide numerous, independent, parallel pathways for the alert messages to reach the recipients.

The National Weather Service (hereinafter "NWS") uses great skill and advanced technology, to predict the weather and then to issue warnings, using many communications systems, to alert the public of approaching severe weather emergencies. The NWS operates a system of over 1,000 VHF FM transmitters located throughout the United States on frequencies 162.400 to 162.550 MHz in a system named NOAA Weather Radio (hereinafter "NWR"). This radio system reaches over 95% of the United States population. NOAA is the acronym for National Oceanic and Atmospheric Administration, which the parent agency of the NWS.

NWR has a normal repeating program loop of approximately 10 minutes of weather information. This normal broadcast is interrupted as necessary when severe weather warnings are issued.

Since the 1970's the NWS has tone alerted severe weather information with an analog 8-13 second tone of 1050 Hz which preceded the broadcast of a severe weather alert. This tone is called the Wide Area Tone (hereinafter "WAT") as it normally covers the approximately 40 mile radius from each NWR transmitter, which usually includes many cities and counties not involved in the alert. The WAT would thereby interrupt people who did not need to be interrupted. As a result they have often turned off their NWR receivers as it had become more annoying than useful.

For these reasons, in about 1996, the NWS implemented a frequency shift keying (hereinafter "FSK") audio based alerting system called Specific Area Message Encoding (hereinafter "SAME") which is compatible with the FCC's national Emergency Alerting System (hereinafter "EAS"). The EAS' primary goal is to transmit an emergency message from the President of the United States to the people through the broadcasters. The WAT is still also transmitted by the NWS on NWR after the SAME alert message to maintain backwards system compatibility.

The NWS' SAME system is received by the broadcasters' EAS equipment that monitor NWR and the broadcasters', in turn, can choose to forward and or broadcast the alert message on their communications channels. NWR is one of the fastest and most reliable methods of receiving severe weather alerts directly from NWS. A special VHF radio receiver is needed to receive NWS NWR alerts. Only about 10% of the United States population owns a NWR radio. Often, a commercial grade NWR receiver is required for reliable reception of NWR SAME alerts at far distances from a NWR transmitter and also in areas of high radio frequency (hereinafter "RF") noise and in other poor reception environments. These poor reception environments often include factories, government facilities, hospitals, amusement parks, and emergency operations centers. Each of these places also has critical needs to reliably receive severe weather alerts in order to protect lives and property.

A number of reliable improvements to commercial grade NWR receivers have been developed, and are in wide use throughout the United States in demanding applications, often being interfaced to other communications system. Some of these NWR improvements include: U.S. Pat. No. 5,444,433 to Gropper for Modular Emergency or Weather Alert Interface System; U.S. Pat. No. 5,574,999 to Gropper for Alert Receiver; U.S. Pat. No. 5,781,852 to Gropper for Alert Receiver Interface; and U.S. Pat. No. 6,323,767 to Gropper for Diagnostic FSK receiver for decoding EAS and same with user definable translations.

While these advanced commercial radios and interface systems have vastly improved the reliability of the reception of NWR weather alerts, the software used to interface these radios to other communications systems has previously been required to operate on the client's computer systems. This has required extensive ongoing interaction with the client's IT departments and has made troubleshooting an ongoing challenge. Further, firewalls rightly make external access to the status of the NWR equipment and software an extreme ongoing challenge. Before the instant invention, there has not been a good way of automatically monitoring the up to the moment status of these critical systems and to be able to identify, notify and correct the system issue efficiently.

There have been a number of other patents that have attempted to address some components of these alert distribution and reliability issues. These include U.S. Pat. No. 7,873,344 to Bowser, et. al, for System and method to distribute emergency information which uses computers (108, 110, 112) to subscribe to alert device 102 to receive alerts. In this embodiment, the alert device 102 sends the heartbeat signal to learn if the computers are online. We have found in practice that firewalls will often prevent the automatic re-creation of a disconnected network communication connection. In the instant invention, acknowledging the existence and challenge working around and through firewalls, all devices taught herein are configured to automatically connect outbound to the remote computer and ping the remote computer on a regular timed basis with a digital string. Each of these devices, including, but not limited to, the alert receiver, the printers and LED signboards all automatically try to reconnect to the remote computer. In this manner, if a connection is lost, as will likely happen overtime, each unit will repeatedly and automatically try to reconnect to the remote computer to try to re-establish the communication link. Additionally, if the remote computer does not receive a timely ping from a field unit, the remote computer closes its Ethernet socket for that device and begins the listening mode for the incoming signal to attempt to reestablish the communications link. The sending and receiving firewalls are preferably set to only permit point to point connections to enhance security. Additionally, the remote computer will immediately know if the remote unit has stopped pinging, despite the sever socket remaining open, and it will be able to immediately restart the connection process, as well as inform a monitor application that a communication connection that has been lost. The instant invention overcomes a number of defects in the system taught by Bowser.

U.S. Pat. No. 7,802,173 to Chan et al. provides an algorithm to parse the National Weather Service's SAME FSK codes. A key drawback in the algorithms suggested in this patent are the teaching that the alert messages have an important and unimportant components. Each item of information in the alert string is critical to the correct decoding and analysis of an alert message. The algorithm taught by the instant patent application is to parse the message into its many component parts, starting with separating the three SAME bursts of information. Then the algorithm taught herein will attempt to match the parts of the message based on the type of characters, such as ASCII numbers versus letters, that are supposed to appear in each section of the message. The algorithm will then compare the decoded parts of the alert message to similar parts in each alert message in the other bursts. If no match is found, the algorithm places the decoded section in the output message string together with "?" which indicates that a no match was found. These two indications of a questionably decoded message provide an important indication to the end user that a message might not have decoded properly, in addition to providing important troubleshooting hints to the end user as to why which parts of the message were thought not to decode properly.

SUMMARY OF THE INVENTION

An object of the instant invention is to provide a monitored, reliable and redundant severe weather and emergency alert system.

Another object of the instant invention is to provide hardware and software system to meet the requirements for distributing weather alerts which has dramatically expanded to include all manner of electronic devices, including smart phones and flat screens. The amount of widely available weather information has flourished. The ability to get weather alerts from multiple independent sources has become a reality. The challenge is how to efficiently and reliably obtain this information from many different sources and to consolidate it in a simple, but useful manner that will require little or no training for use, but will highlight the critical information at a glance.

Another object of the instant invention is to provide a hardware and software system to distribute weather and emergency alerts throughout the client's locations, which are often limited by additional firewalls, in a secure and monitored manner.

Another object of the instant invention is to provide a hardware and software system to enable digital weather alert data to reach remote computers in a reliable manner through firewalls.

Another object of the instant invention is to provide a hardware and software system to enable digital weather alert data to reach remote computers in which individual communication channels are constantly monitored.

Another object of the instant invention is to provide a hardware and software system to enable digital weather alert data to reach remote computers to which the system will automatically try to reestablish lost communication channels.

Another object of the instant invention is to provide a hardware and software system to enable digital weather alert data to reach remote computers in which the system will automatically notify persons at both ends of the communication channel that a communication link has been lost or to confirm that it is operational.

Another object of the instant invention is to provide a hardware and software system to enable digital weather alert data to be reliably decoded through the use of a sophisticated algorithm to attempt to recover useful data from corrupted alert messages.

Another object of the instant invention is to provide a hardware and software system to enable digital weather alert data to be decoded, translated and distributed to multiple communications systems including by email, LED signboard, web site, streaming audio and interfaces to other communications systems, including radio systems, and through the activation of alarms.

Another object of the instant invention is to provide a hardware and software system to enable digital weather alert data from multiple sources to be simultaneously displayed for instant comparison and analysis by the end user to prevent a single point of failure and to provide verification of the status of the alert messages.

Another object of the instant invention is to provide a hardware and software system to enable digital weather alert data to be displayed with locally obtained weather sensor data for comparison and analysis with weather reports and weather alerts from multiple sources.

Another object of the instant invention is to provide a hardware and software system to enable digital weather alert data to be created in a format that is useful on multiple communications platforms including web sites, flat screen displays and smart browser enabled cell phones.

Other objects of the instant invention will be apparent as set out herein.

BRIEF DESCRIPTION OF THE DRAWINGS

FIG. 8 is a screen shot of the web site showing the currently active NOAA digital weather and emergency alerts with color coded precedence, area, text and expiration time.

FIG. 11 is a screen shot of the system status web site showing and analyzing each reading and providing a detailed visual and email summary of all correct and incorrect readings.

DETAILED DESCRIPTION OF THE PREFERRED EMBODIMENT

Detailed embodiments of the present invention are disclosed herein. It is to be understood, however that the disclosed embodiments are merely exemplary of the invention that may be embodied in various forms. Therefore, the specific structural and functional details disclosed herein are not to be interpreted as limiting, but rather as a basis for the claims and as a representative basis for teaching one skilled in the art to variously employ the present invention in virtually any appropriately detailed system or structure.

Figure 1:
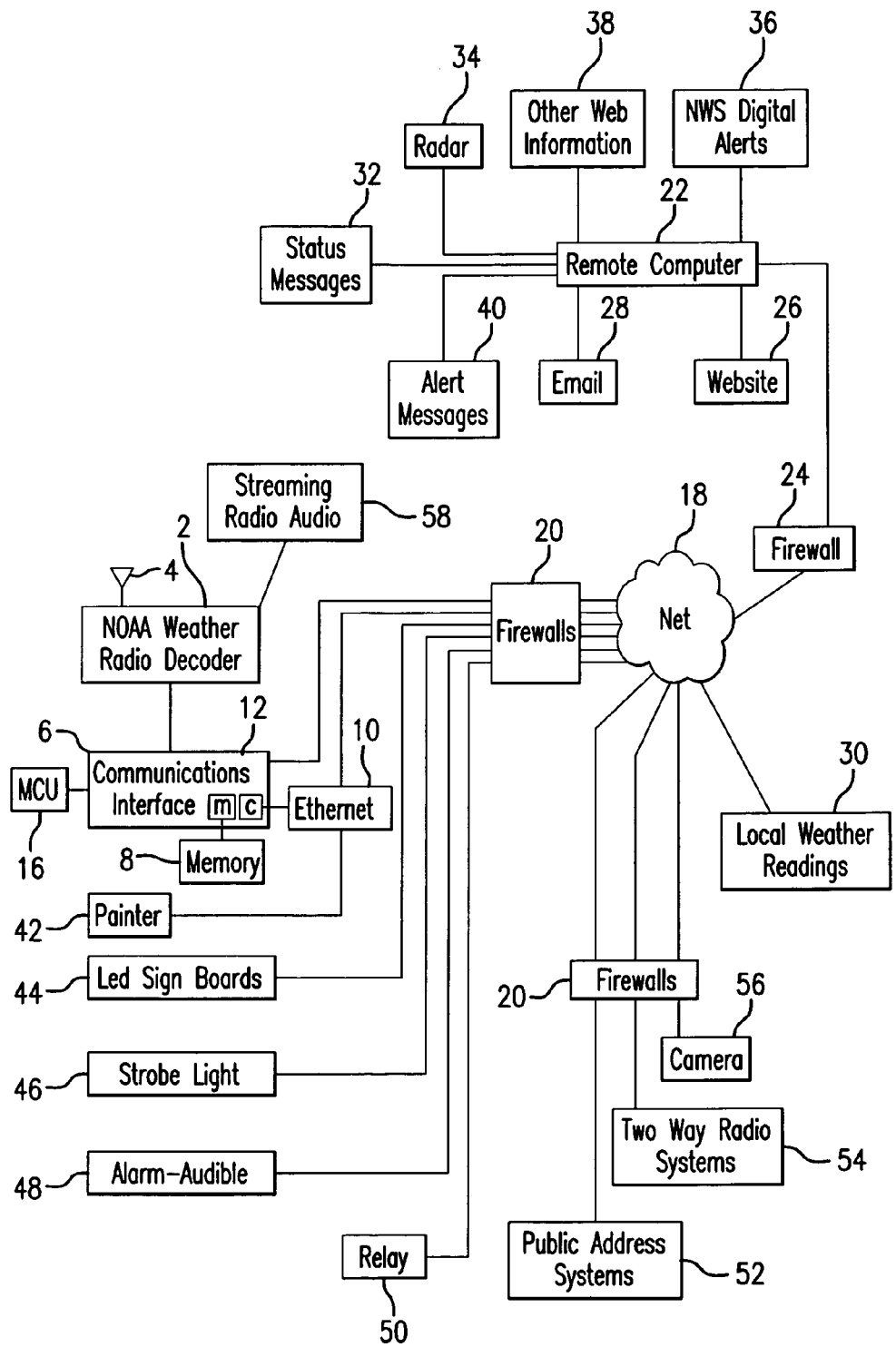
FIG. 1 is a block diagram of the core components of the monitored weather and emergency alert messaging system.

FIG. 1 is a system block diagram of the herein taught invention showing the many inputs and outputs of the system. Some or all or additional elements may be placed into any system as needed and as technology changes and advances. The current preferred embodiment includes a radio receiver 2 which usually has an attached antenna 4 for the reception of alert messages that have been broadcast over the air. This radio receiver 2 needs to be of excellent quality for reliability and for the rejection of unwanted and interfering radio signals. Suitable radio receivers 2 are similar to the operation and functionality of radio receivers taught by one or more of the following patents: U.S. Pat. No. 5,444,433 to Gropper for Modular Emergency or Weather Alert Interface System; U.S. Pat. No. 5,574,999 to Gropper for Alert Receiver; U.S. Pat. No. 5,781,852 to Gropper for Alert Receiver Interface; and U.S. Pat. No. 6,323,767 to Gropper for Diagnostic FSK receiver for decoding EAS and same with user definable translations.

Radio receiver 2 usually receives analog FM broadcasts of information from an entity such as the National Weather Service (hereinafter "NWS") thorough their NOAA Weather Radio (hereinafter "NWR") network of transmitters. Usually analog voice weather information is broadcast over NWR. At appropriate alert times, the NWS also transmits digital codes in an FSK format, which contains critical information about severe weather and non weather emergency messages. An FSK alert message decoder 14 is connected to radio receiver 2 which decodes the digitally coded severe weather information and outputs an ASCII stream of characters. Usually the NWS transmits the same weather alert information over NWR three times to provide an opportunity to compare the bursts and verify the information, as will be discussed herein. It is possible that not all three FSK bursts will be received due to many possible atmospheric, radio and data decoding challenges. FSK alert message decoder 14 will output all raw NWS NWR digital data that it receives.

FSK alert message decoder 14 is communicatively connected to communications interface 6. This is normally accomplished through RS-232 data transfer mode. FSK alert message decoder 14 places the FSK data received from the FSK decoder 24 into non volatile digital memory 8. Digital memory 8 is normally non volatile flash electrically re-writable memory. The memory operations in communications interface 6 are controlled by microcontroller or computer controller (hereinafter "MCU") 16 which is often referred to as MCU 16.

Since MCU 16, which is usually interrupt driven, will not know how many of the three FSK data bursts will be decoded, or the length of each message, as this will vary from 1 to 31 according to the number of counties in each message, MCU 16 will start a timer upon the receipt of the first burst and will wait until no further burst has been received for a defined time period, such as 2 seconds, before processing the message.

A plurality of LEDS 12 provides a visual indication of the status of MCU 16 processing the FSK message. Generally this will include indications of message received by MCU 16, timer activated, message being processed by MCU 16 and message being output by Digital communications interface 10. MCU 16 message processing will usually include the removal of all non printable ASCII characters from the alert message string. Poor radio reception and decoding errors will often introduce non printable ASCII characters into the alert message string that will interfere with further message parsing and analysis, as further described herein.

Once the alert message string, which may consist of up to three bursts of the same alert message decoded data, has been fully processed by MCU 16, MCU 16 outputs the single long string of all received information through Digital communications interface 10. Digital communications interface 10 is usually a serial to Ethernet adapter that connects with MCU 16 and digital memory 8, on one side, and the global communications infrastructure, now known or hereinafter created, and is generally called net 18. Communications between computer communications interface 6 and net 18 is generally through TCP/IP protocol. Another MCU 16 may be located inside Digital communications interface 10 to control the operations of the Digital communications interface 10.

Often end users connected to the net 18 utilize a firewall 20 which enable net 18 communications from within firewall to net 18, but not communication, unless authorized, from net 18 outside firewall 20 to inside firewall 20. We have therefore found it advantageous to configure Digital communications interface 10 to automatically initiate communications connections to remote computers 22 on net 18. This is true even where remote computer 22 in within firewall 20 and even on the same network as Digital communications interface 10. Also, communications interface is preferably configured to automatically re-initiate the connection to remote computer 22 on net 18 should communications ever be lost. These set up features greatly enhance the reliability of the communications system from the communications interface 6 through net 18 to remote computer 22.

Remote computer 22 can be any robust computer that can listen on ports and may be preferably a Windows based server running a program such as Windows Server 2003. Preferably another firewall 24 will protect remote computer 22 from net 18. Remote computer 22 can be either co located with interface units such as radio receiver 2, or can be located at a remote location, provided there is net 18 connectivity between these units.

Remote computer 22 should be configured to be as reliable as possible with features such as being located in a secure data center having both computer uninterruptible power supplies in addition to power surge protection, back up generator power, climate protection, virus protection, software updates and technical support monitoring around the clock for maximum reliability. The data and settings on remote computer 22 should automatically be backed up and secure remote access for remote server maintenance should be provided.

Remote computer 22 should also be able to access and process many types of data directly from net 18 and remote computer 22 should also be able to host web sites 26 and be able to send email 28.

It will be understood that remote computer 22 can be one or more computers and can be hot paralleled for additional reliability. Preferably remote computer 22, should there be more than one, should be located at different geographical locations to further provide reliability.

A source of local weather readings should be provided from a professional weather station 30. Weather station 30 should output its readings in an ASCII format which can be connected to net 18 and then to remote computer 22 through firewalls 20 and 24 in the same manner as Digital communications interface 10 is connected to remote computer 22. Weather station 30 should detect and analyze wind speed and direction, temperature, barometer, humidity, rainfall, solar lighting, lightning, in addition to logging daily highs and lows. The data from professional weather station 30 is usually accessed by a program on remote computer 22 sending a series of ASCII data inquiries, to which weather station 30 responds back to remote computer 22 with a data string. The data string is received and is analyzed by remote computer and the data is then displayed on web sites 26.

Remote computer 22 also creates and manages an ongoing series of status messages 32. These will include, but are not limited to, the last time communications interface 6 sent a timed digital message to remote computer 22 and the last time MCU 16 responded back to remote computer 22 with weather data.

Status messages 32 are analyzed and compared to normal expected readings and a composite of status messages is automatically created by remote computer 22. Status messages 32 are also placed on a secure client web site where the readings are preferably color coded, with green meaning good and red meaning bad and yellow meaning needs possible attention. Remote computer 22 will periodically prepare a status email 28 both when everything is operational, and when there are items that need attention, to be discussed in further detail herein.

Remote computer 22 should have automatic access to many sources of information on the web, including but not limited to radar imagery 34, digital text alerts 36 from organizations such as the NWS, Federal Emergency Management Agency, U.S. Department of Homeland Security, and local and state emergency management messages. Remote computer 22 should also have access to other sources of information on the web 38 such as school closings, flood information, emails and text alerts about emergencies, and such other information and might be deemed useful to the end users.

As will be discussed in detail herein, remote computer 22 should also be able to create and process alert messages 40 and be able to place them on, and or activate, multiple output units, now known, or hereafter created, including, but not limited to, printers 42, LED signboards 44, strobe lights 46, audible alarms 48, relay 50, public address systems 52, and two-way and broadcast radio systems 54.

Further, the analog audio from radio receiver 2 can be digitally streamed to web site 26 and can be automatically unmuted by the receipt of a newly issued weather alert as detected and displayed on web site 26.

Local cameras 56, which stream images to the remote computer 22 and then to the web sites 26 have proven very useful to be able to actually 'see' what the sensors are seeing to be able to verify the sensor data.

A method to digitize and stream real time audio 58 from radio receiver 2 to remote computer 22 to audio players in web site 26 has also proven very useful. The streaming audio 58 may be manually unmuted on demand, and or may be set to automatically unmute when a new alert message is issued.

Figure 2:
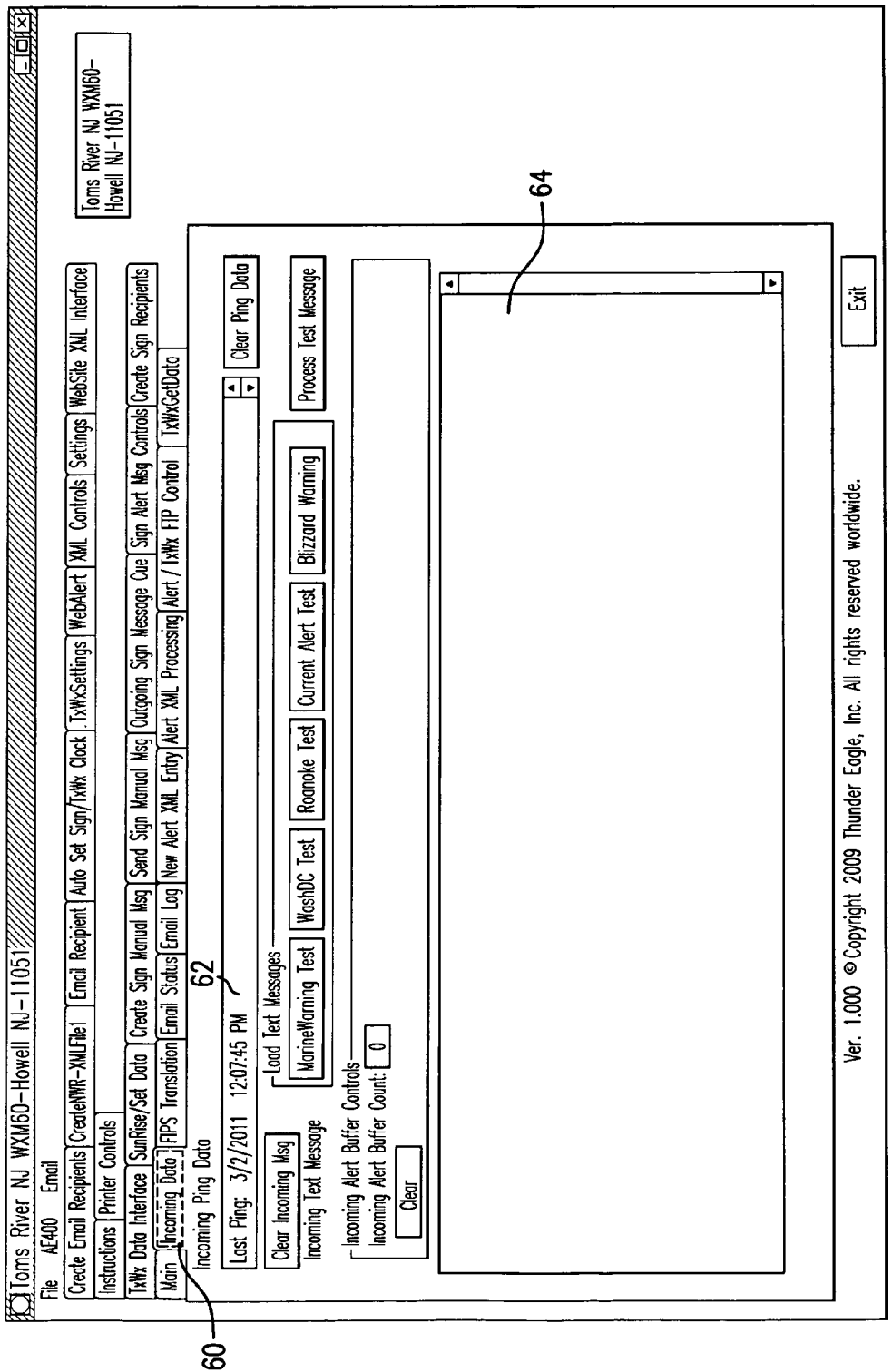
FIG. 2 is a screen shot of the remote computer receiving the timed digital status message from an alert device.

FIG. 2 is a screen shot of a computer program running on remote computer 22 that is listening for the timed digital message from Digital communications interface 10. Incoming data tab 60 controls and analyzes the data from Digital communications interface 10. The date and time of the last timed digital message 62 from Digital communications interface 10 is displayed in a text box on incoming data tab 2. The timed digital message should be a string of ASCII data and may include data on the status of the radio receiver 2, including, but not limited to, whether or not the transmitter is being received by radio receiver 2 and whether or not audio is being received by receiver 2. This information is used by remote computer 22 to reestablish a connection socket if the connection to Digital communications interface 10 is lost, and to create status messages 32 on the status of the radio transmitter and audio for display on web site 26 and email 28, whether or not the status of each item is operating within specifications.

Incoming tab 60 also includes a text box to display the actual incoming text received from Digital communications interface 10 into buffer 64. The ability to see the text is an excellent diagnostic tool to make sure the exact message that is being sent is being received by remote computer 22. Remote computer 22 waits for a specified period of time for the incoming message to be completely received in its buffer 64. This is necessary as the time for data traveling though the internet can vary greatly and it is important for the entire message to be received before processing. Usually the remote computer 22 will wait for no further data to be received for 2 seconds before assuming that no further data is inbound to remote computer 22.

Upon receiving the entire message from Digital communications interface 10, remote computer 22 will scan and remove all non printable ASCII characters that may have been entered into the incoming data string while in transit through the net 18. This filter has greatly added to the reliability of the communication system. Remote computer 22 will send an acknowledgement digital text message to Digital communications interface 10 to acknowledge safe receipt of the alert message. Digital communications interface 10 may display the receipt this acknowledgement by lighting a LED, sounding a beep, or in other manners to provide a diagnostic feedback to the sender that the message has been received by remote computer 22. This also is a great diagnostic function. Lost communications connections will also be annunciated on the local units by LEDS and/or sound and/or other alerting means.

Figure 3:
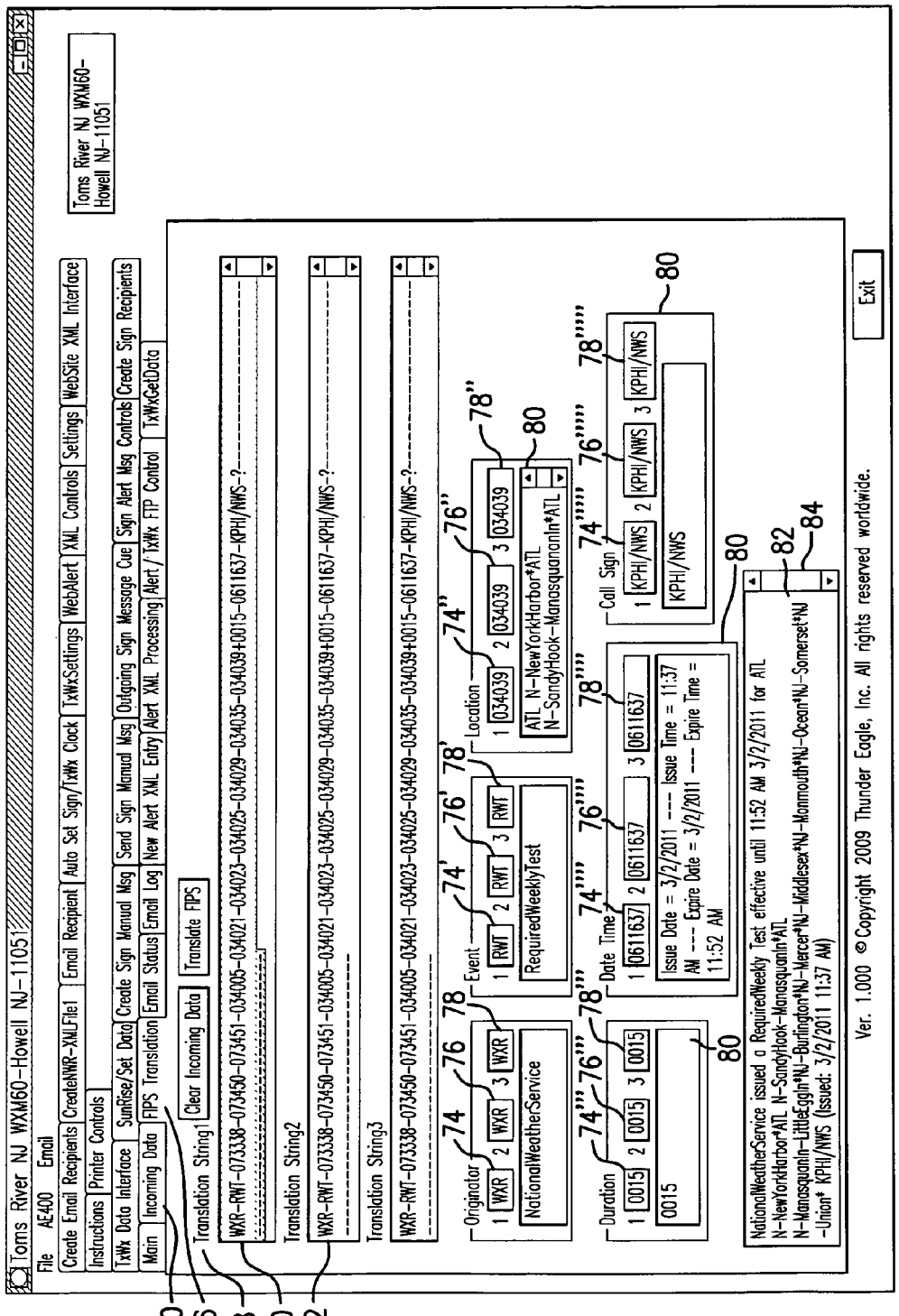
FIG. 3 is a screen shot of the remote computer receiving three raw bursts of the NWS SAME code, parsing the three raw text strings and then sub parsing and comparing of each component of the of the three raw bursts and then analyzing and translating the raw codes into a completed text alert message.

FIG. 3 shows the FIPS (Federal Information Processing System) translation tab 66 on remote computer 22. Once the incoming data from radio receiver 2 has been fully received and processed by incoming data tab 60, and the data processed as described above, the up to three bursts of data are parsed and analyzed by FIPS translation tab 66. Initially, remote computer 22 attempts to parse up to three FIPS messages into their component strings and places them in text boxes for respectively translation string 1, 68, translation string 2, 70 and translation string 3, 72. This is a great diagnostic to see if the up to three alert messages were decoded, and to see if any parts of any message were either not decoded, or were corrupted, which might mean that radio receiver 2 and FSK alert message decoder 14 did not receive a sufficiently acceptable signal. This is a great diagnostic.

Once FIPS Translation tab 66 parses the entire three messages into their component strings and displays the strings in translation string text boxes 68, 70 and 72, remote computer 22 then compares each segment of each message and places them into segment text boxes shown as 74, 76 and 78 for each of the respective categories of message parts such as Originator, Event, Location, Duration, Date and Time, and Call sign. This is a great diagnostic tool to see if remote computer 22 was able to parse one, two or three parts of each message into its component parts.

It is important to note that there may be between 1 and 31 locations in any message and the locations are a series of coded numbers that need to be translated. The remote computer 22 first analyzes each of the strings to make sure they are of the correct type, ASCII number versus letter, and then tries to find various matches using many algorithms. If errors of type of letter versus number are found, question marks are added to the string as a diagnostic tool and the string and the question marks are placed into the output alert message 40.

Once remote computer 22 has determined the best match based on the received FIPS code string, remote computer uses look up tables and translates the raw FIPS codes into readable text. For example WXR becomes National Weather Service. The translated text components are placed into component text boxes 80. Remote computer 22 translates the received date and time stamp from the Julian calendar format to text and then calculates the duration of the event and also creates a text string.

Remote computer 22 then combines these parsed messages into an outgoing concatenated alert string 82 for further processing which appears in text box 84.

Figure 4:
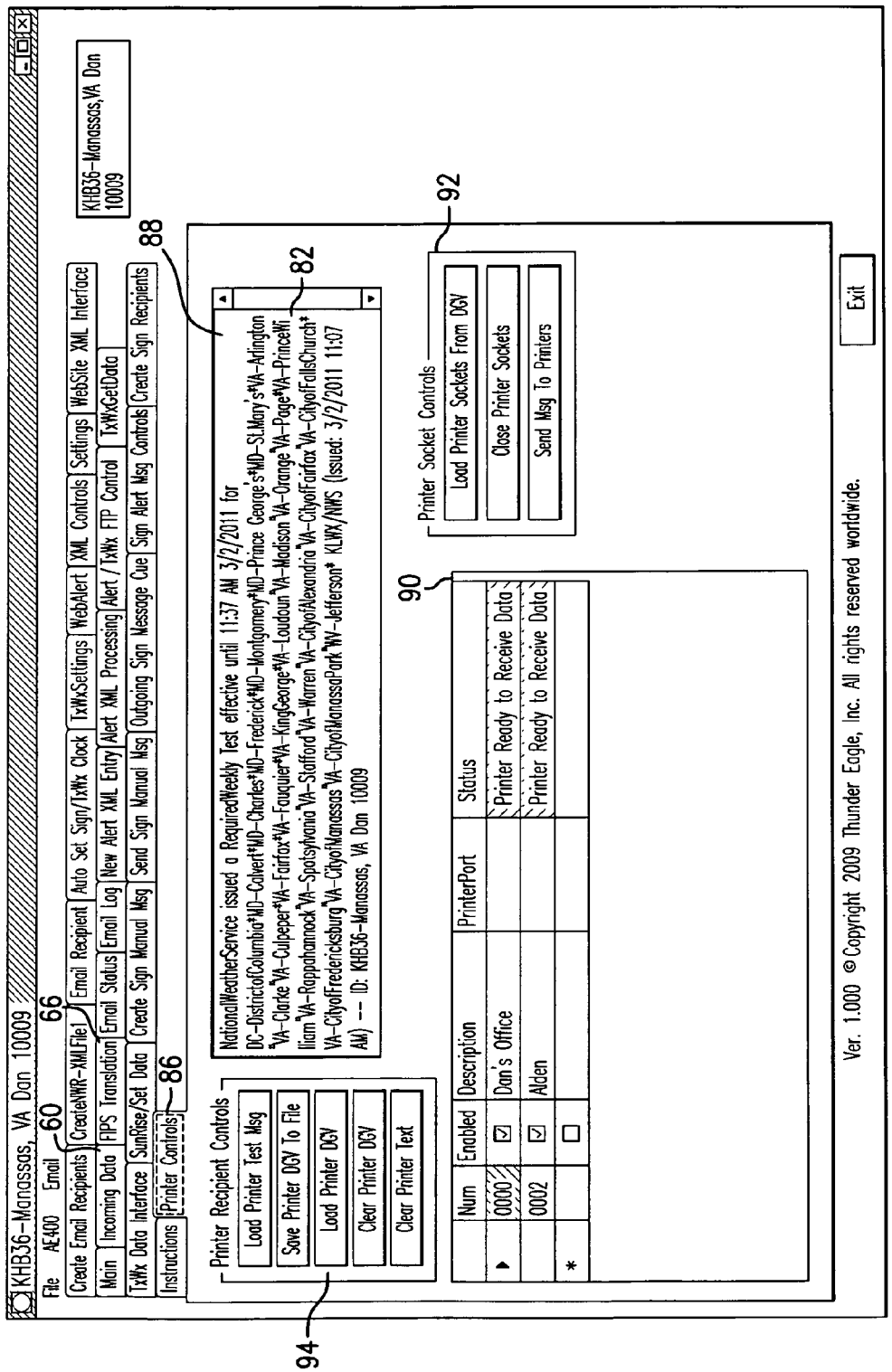
FIG. 4 is a screen shot of the remote computer sending the completed and translated text message to printers with verification that the printer received the alert message.

FIG. 4 shows outgoing concatenated alert string 82 in printer tab 86 in printer alert message text box 88. Remote computer 22 then sends concatenated alert string to each printer listed in printer box 90. Each printer 42 will separately acknowledge receipt of the concatenated alert message 82. Remote computer 22 will consolidate the status messages received from each printer and prepare a status message 32 for display on web sites 26 and email 28. Test diagnostic tools for sending test messages to each printer are also included as a great diagnostic tool.

Status message 32 may also be generated based on the last time of update of the many computer files that are stored on remote computer 22 for display on web site 26. Remote computer 22 will periodically monitor if the time span for the last expected update of a file is current or is overdue and will create and display a status message 32 on web site 26 and email 28 if necessary.

Emails 28 can also be created for a change of status and threshold of various readings on web site 26 for many conditions, including, but not limited to the occurrence of lighting based on the strikes per minute and the time duration between lighting readings exceeding a user set threshold, wind gusts exceeding a user set threshold, and rainfall rate exceeding a user set threshold. Additionally, emails 28 and web site 26 messages can be displayed through remote computer 22 automatically accessing an email address, accessing an email, verifying it is the type of email to be displayed on the web site 26, parsing the email text and then displaying the parsed text on the web site 26.

Figure 5:
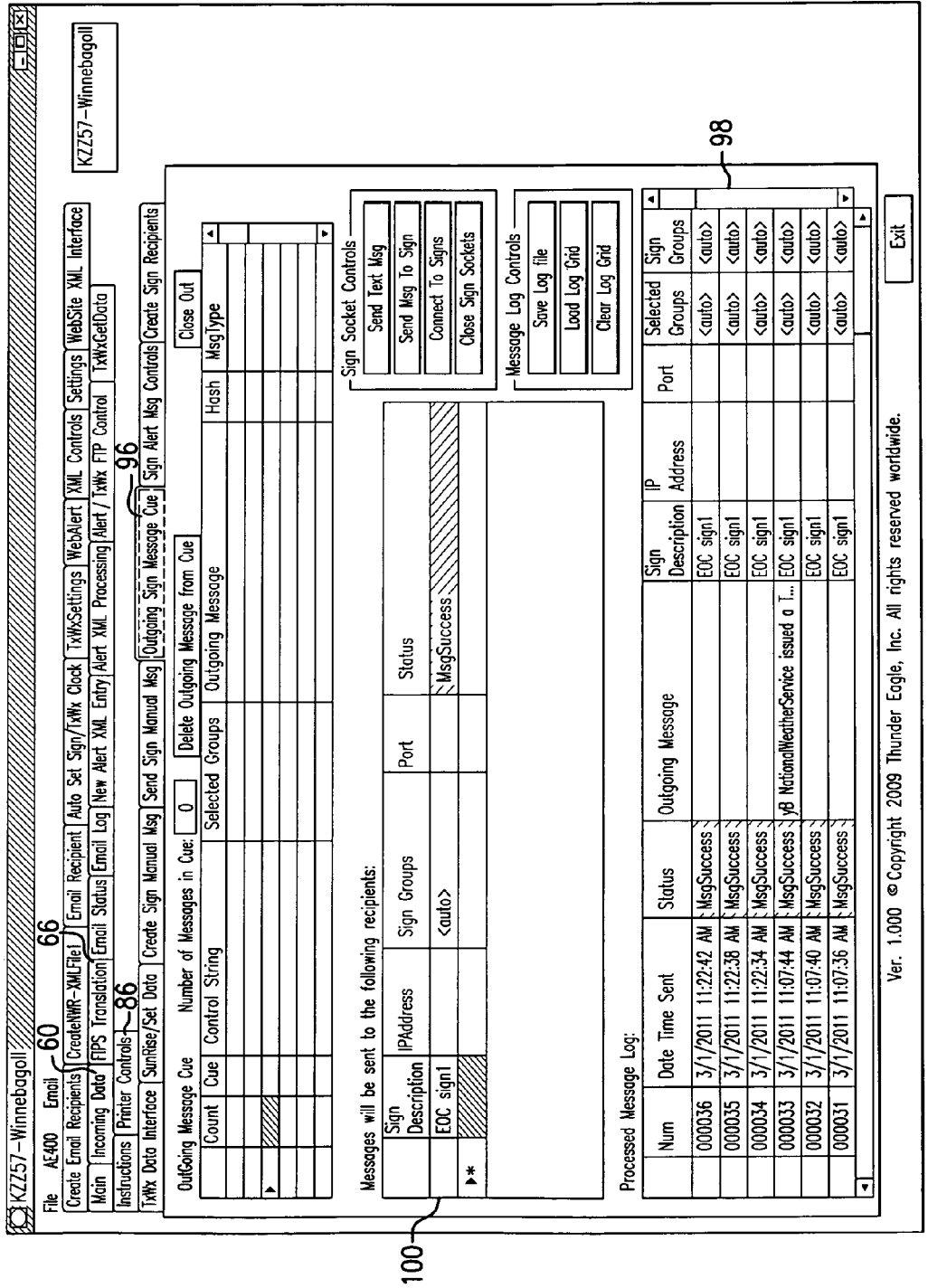
FIG. 5 is a screen shot of the remote computer sending the completed and translated text message to LED signboards with verification that each signboard has received the alert message and also showing the alert message log.

Similarly FIG. 5 shows the interface to send messages 32 to each LED signboard 44, designated by outgoing sign message cue tab 96. Remote computer 22 sends concatenated alert message 82 to each LED signboard 44 in signboard recipients list 100 and each signboard 44 acknowledges whether or not the message was successfully received by each signboard 44. Each transaction with each signboard 44 is logged in log 98. Remote computer 22 will consolidate the status messages received from each signboard 44 and prepare a status message 32 for display on web sites 26 and email 28.

Test diagnostic tools for sending test messages to each LED signboard 102 are also included as a great diagnostic tool. If remote computer 22 connection with signboard 44 is lost, remote computer will automatically attempt to re-create the connection.

Figure 6:
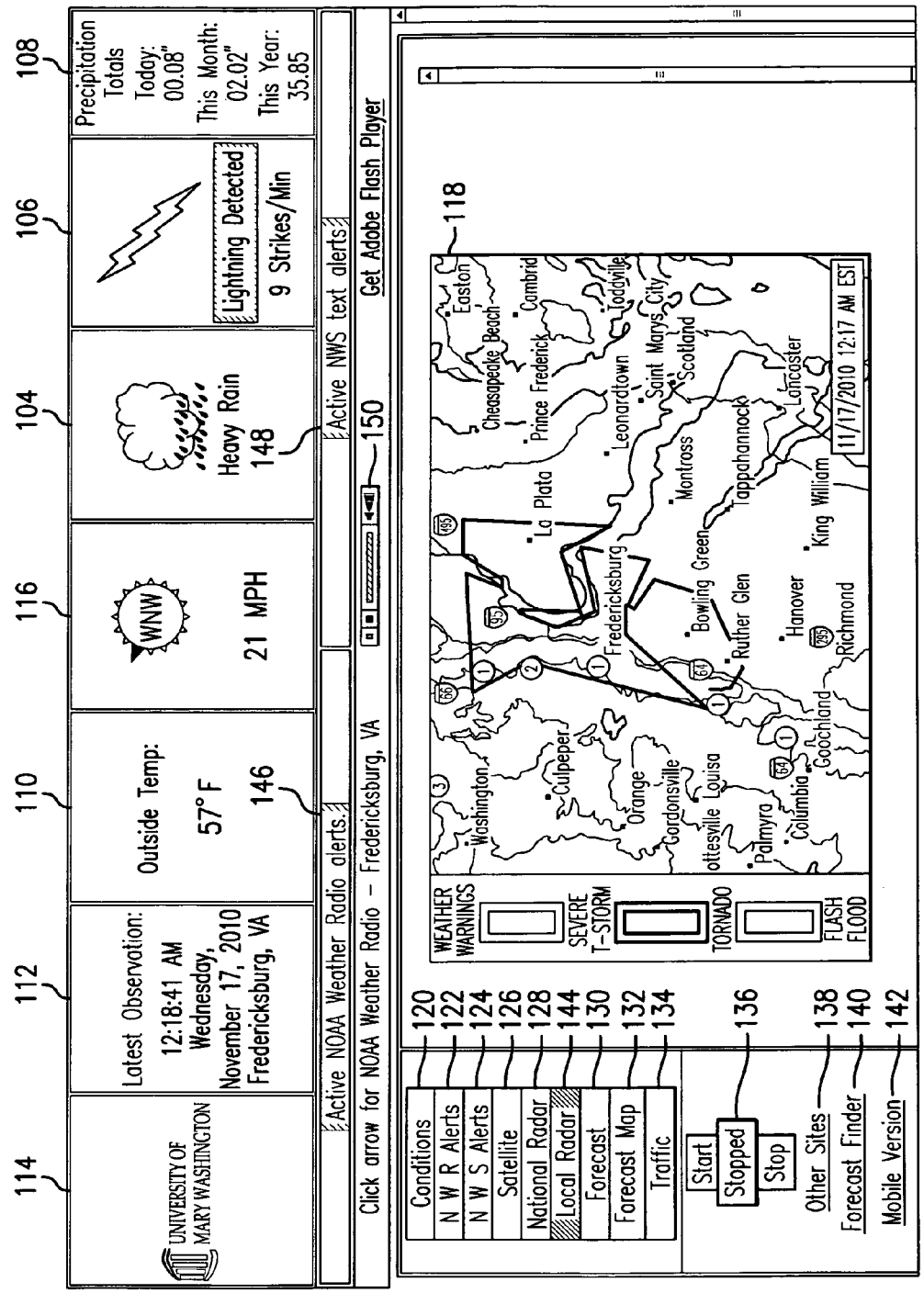
FIG. 6 is a screen shot of the web site showing the local weather real time observation with temperature, wind, real time rain analysis, lightning detection and radar showing the active warnings overlaid onto the radar image.

FIG. 6 is one of a series of screenshots of web site 26 that is created by remote computer 22. The theory of web site 26 is to have warnings from multiple different sources for one geographic area appear in one easy to navigate web site 26.

Local weather readings 30 appear on website 26 after analysis and synthesis by remote computer 22. For example, a local weather reading 30 is rain rate. Remote computer 22 interprets the rain rate and displays a light rain or heavy rain icon 104 based on the actual rainfall rate. The same is true for lightning 106, rain data 108, wind speed and direction 116, temperature 110, time, date and place of observation 112, and sponsor's logo 114.

Web site 26 may preferably consist of numerous frames 118 that appear in a slideshow format. The slideshow can be started and stopped by the user by pressing button 136 and an indication is given of the current scan status of web site 26. Frames 118 can include any pertinent data, but may preferably include frames 118 for current conditions 120 from local weather station 30, active alerts from NOAA Weather Radio 122, active NWS digital text alerts for the pertinent area 124, satellite 126, national radar 128 showing warnings overlaid on the map, local radar 144 showing warnings overlaid on the map, seven day forecast 130 showing a list of active warnings for the pertinent area, the national forecast map 132 and outside cameras 134 showing the visual conditions in the pertinent area.

Thus, there are at least four sources of warnings for end users to compare including NOAA weather radio 122, NWS digital text alerts 124, local forecast 130 and local radar overlay 144. This provides multiple sources of warnings to limit the instances of missed warning. Also, for various policy and technical reasons, warnings issued on one means may reach the web site before the same warning issued through another means. For example, NOAA weather radio warnings 122 routinely beat NWS digital text alerts 124 to web site 26, but NWS digital text alert messages contain the full text of the alert, whereas NOAA weather radio alerts 122 only contain the limited header information of what, where and when an event will Occur.

Pressing the start and stop buttons 136 gives the user control over the data viewed by the user in web site 26. Other links may be provided as desired by the end user such as, but not limited to, links to other pertinent web sites 138, a forecast finder 140 to get the forecast and warnings for any location in the United States, and a link to the mobile version 142 of the web site.

Labels 146 are provided that indicate that there are active NOAA weather radio alerts and NWS active digital text alerts 148. Streaming NOAA weather radio audio can be accessed through an embedded audio player 150.

As desired by the end user, labels and links can be added to automatically obtain and display information from a wide variety of sources including school closings, river flood gauges, and text alert emails where the email is automatically recovered and displayed on the web site 26.

Figure 7:
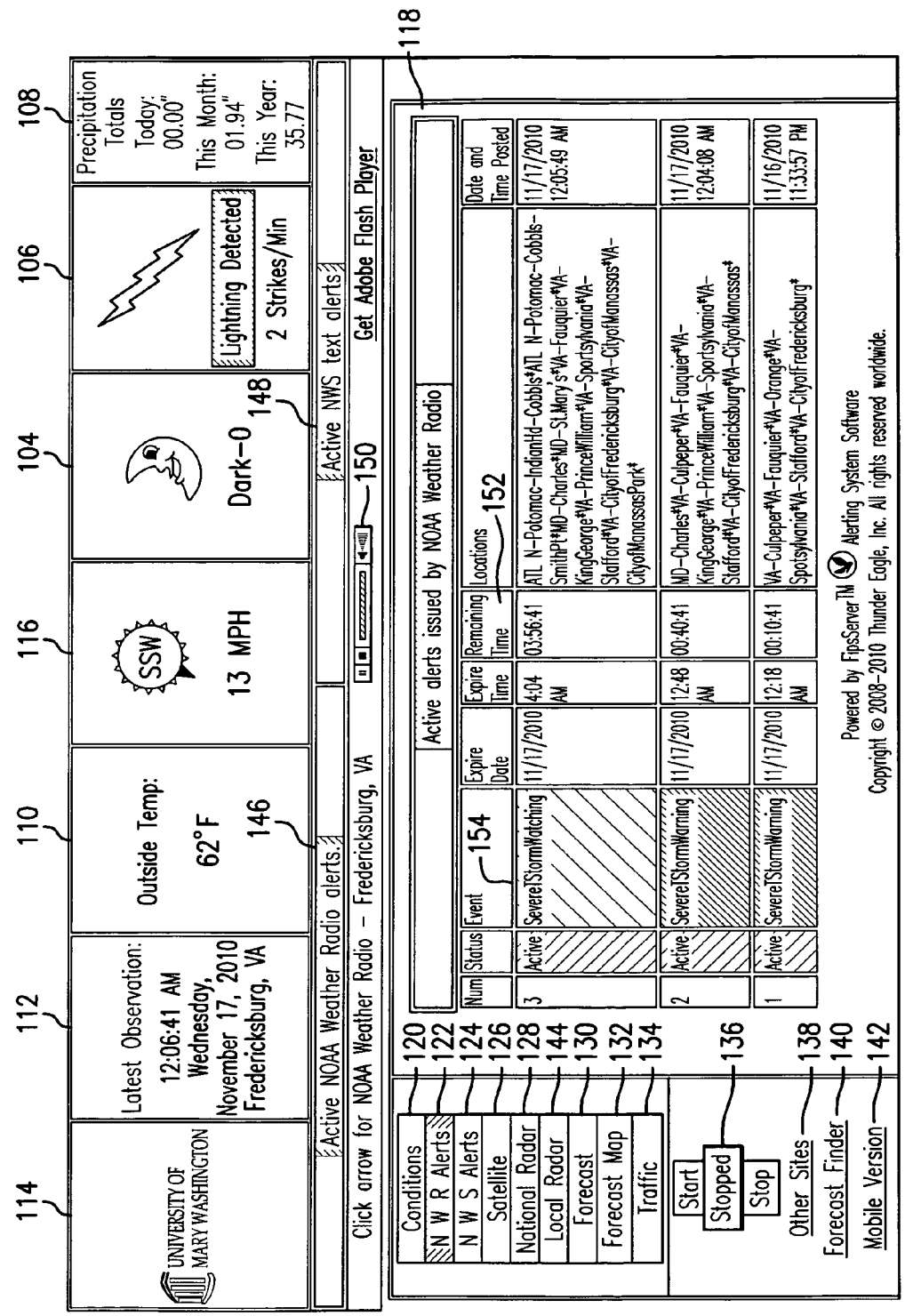
FIG. 7 is a screen shot of the web site showing the currently active NOAA weather radio alerts with the remaining alert time automatically calculated and displayed and the precedence of the message appearing in color codes.

FIG. 7 shows the data described in FIG. 6 and a frame showing NOAA weather radio alert messages 122. These alerts are color coded 154 by type, for example warnings are red, watches are yellow and tests are green. Remote computer 22 automatically calculates the remaining time of each alert and displays the remaining time 152 on web site 26. The other information from the alert is displayed in the frame in tabular format for ease in reading.

Figure 8:
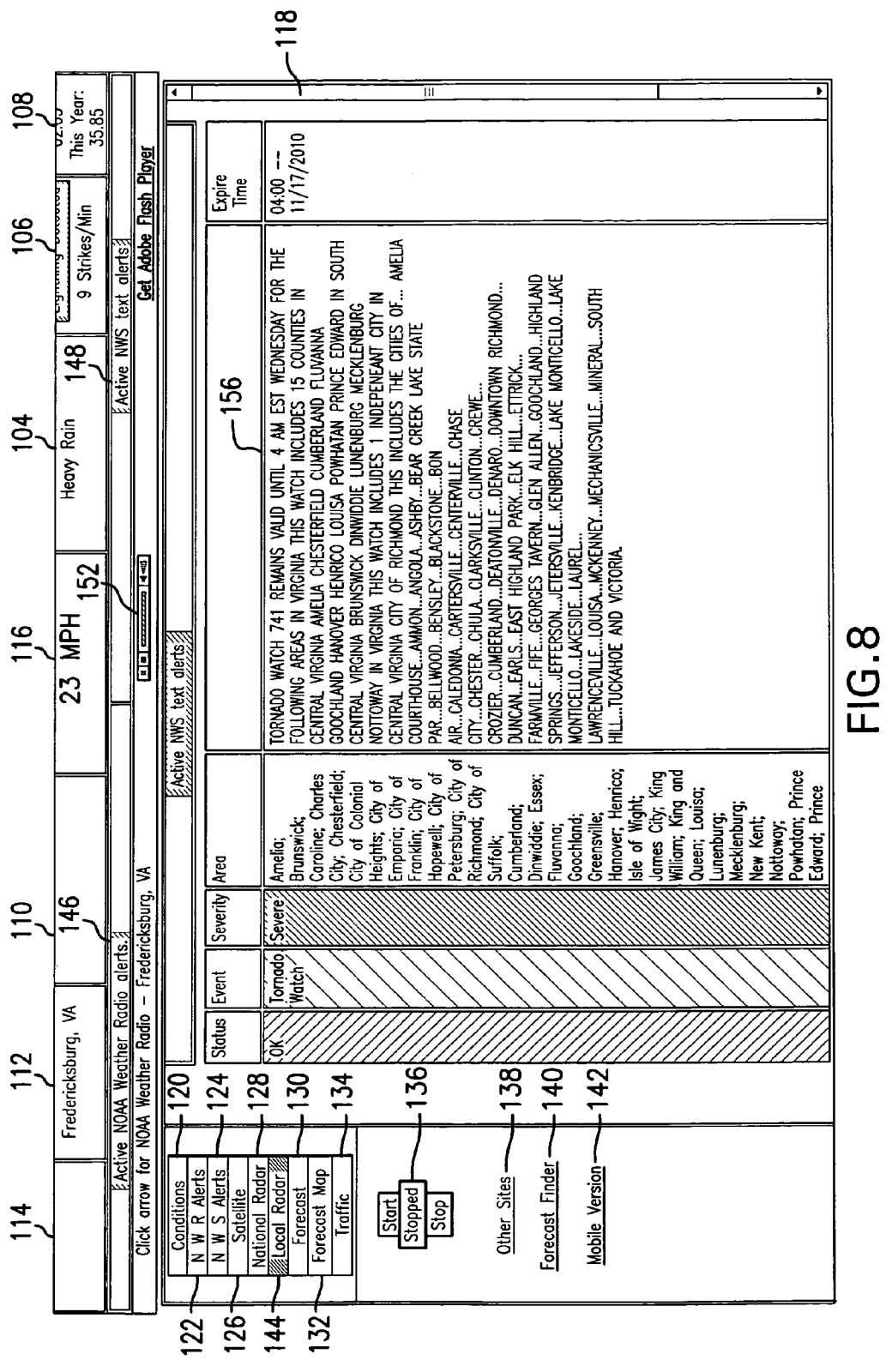

In a similar manner as described in FIG. 7, FIG. 8 shows NWS digital text alerts 156 which show the full text of each alert. This serves as a significant backup to NOAA weather radio.

Figure 9:
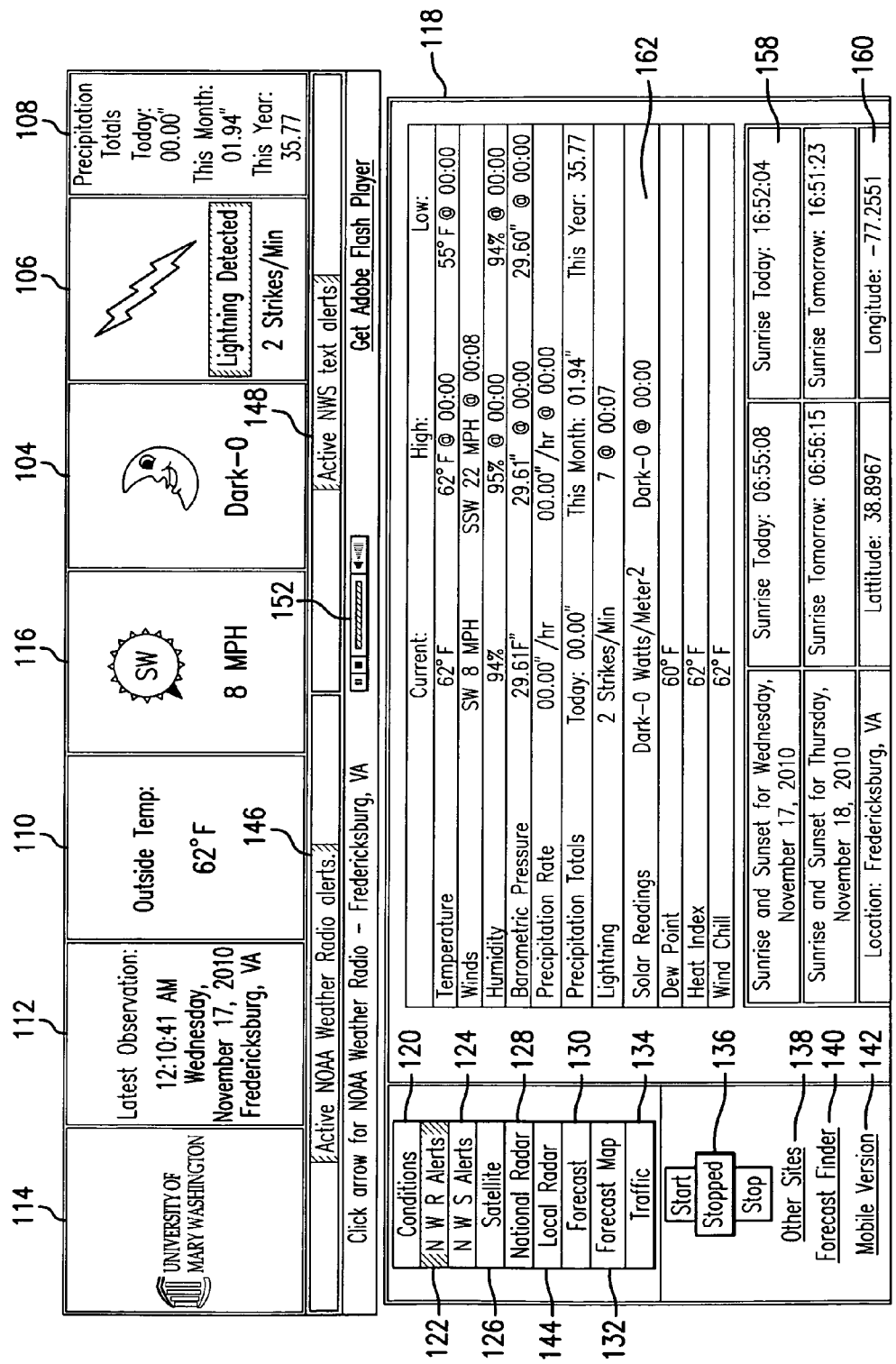
FIG. 9 is a screen shot of the web site showing the currently automatic weather observations as well as sunrise and sunset and latitude and longitude.

Similarly, FIG. 9 shows current local weather readings 162 from local weather readings sensor 30 through remote computer 22. Additionally, important readings such as sunrise and sunset 158 can be displayed on web site 26 as well as the latitude and longitude 158 of the subject location can be displayed.

Figure 10:
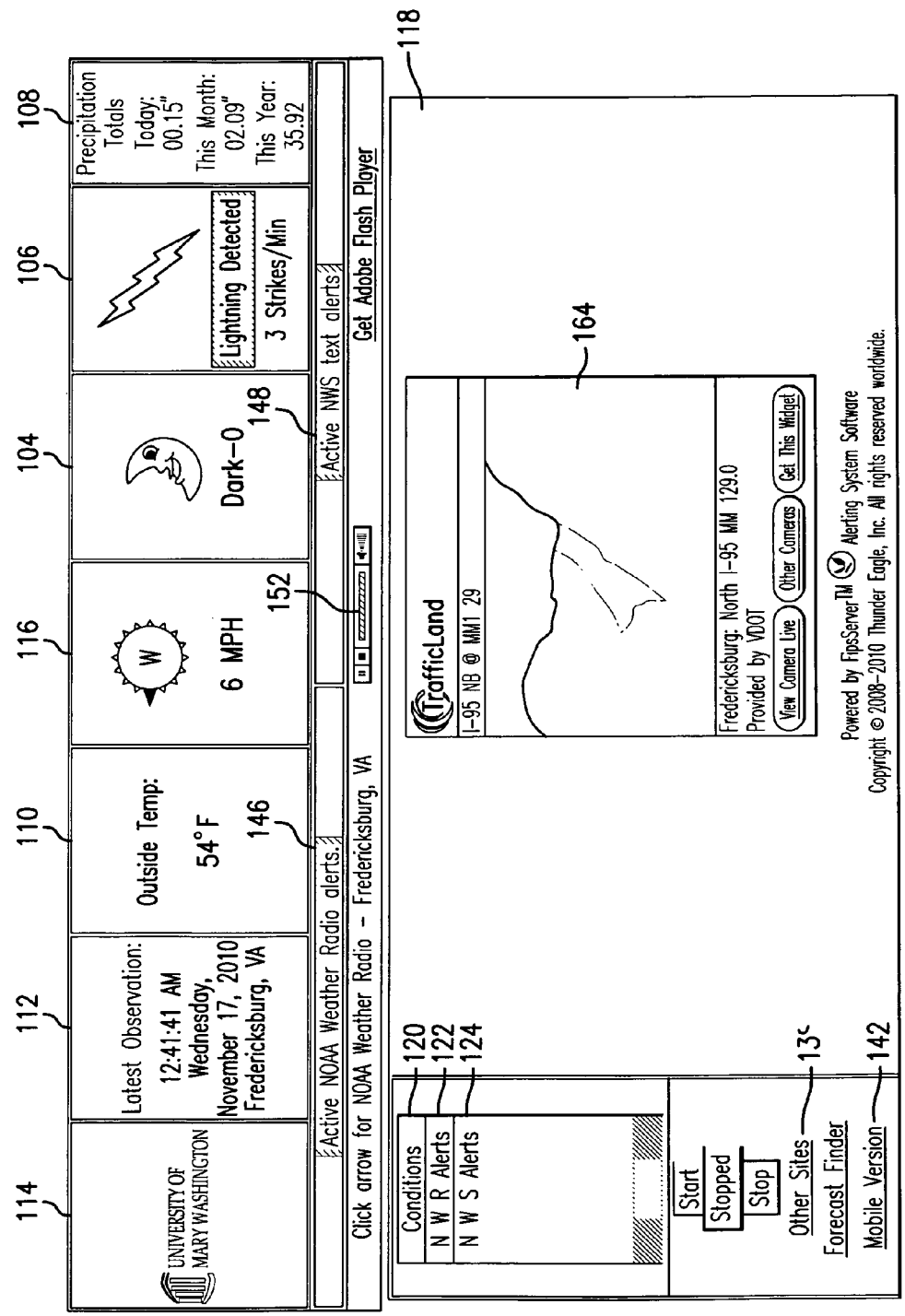
FIG. 10 is a screen shot of the web site showing the current outdoor camera to be able to observe the weather.

FIG. 10 similarly shows video images 164 from outdoor cameras to provide a visual indication for users to verify the weather sensor information provide by the local weather sensors 30 and the other information on web site 26.

FIG. 11 shows the compilation of status messages 32 from remote computer 22. All individual readings 166 from all of the sources are analyzed and a status is given a status 168 which is displayed on web site 26. The date and time of the last file update 170 is obtained by remote computer 22 and then remote computer 22 calculates the elapsed time 172 and then displayed an analysis of all of the data 174. Remote computer 22 then prepares a status summary 176 which is them displayed on web site 26 as well as sent to administrators by email 28. Note that a detailed message which includes the suspect readings is sent as part of the alert message to aid in diagnostics of the possible issue.

It is to be understood that while certain embodiments of the present invention have been illustrated and described, it is not to be limited to the specific forms or arrangements herein described and shown.

What is claimed is:

1. A monitored weather and emergency alert system comprising:
    a) a radio receiver for receiving digital weather and emergency alert messages over the airwaves;
    b) an alert message decoder, connected to said radio receiver, to decode said digital weather and emergency alert messages;
    c) a digital memory, connected to said alert message decoder, to automatically store each said digital weather and emergency alert message;
    d) a digital communications connection to a remote computer, connected to said digital memory wherein said digital communications connection to said remote computer is automatically initiated by said digital communications connection;
    e) a computer controller connected to said digital communications connection and to said digital memory, wherein said computer controller detects the reception of each new said digital weather and emergency alert message and wherein n said computer controller automatically sends each said digital weather and emergency alert message to said remote computer through said digital communications connection;
    f) wherein said computer controller automatically sends a digital message on a timed basis to said remote computer for said remote computer to be able to monitor the presence of and the proper operation of said digital communications connection and of said computer controller and of said alert message decoder and of said radio receiver;
    g) wherein said remote computer monitors, analyzes and responds to the timed reception of said timed digital message from said computer controller; and
    h) wherein said remote computer automatically analyzes and processes said digital weather and emergency alert messages received from said alert message decoder.

2. A monitored weather and emergency alert system, as recited in claim 1,
    wherein said radio receiver is a NOAA weather radio.

3. A monitored weather and emergency alert system, as recited in claim 1,
    wherein said digital weather and emergency alert, messages are encoded in the emergency al err system or specific area message encoding format.

4. A monitored weather and emergency alert system, as recited in claim 1
    wherein said alert message decoder is an FSK audio decoder.

5. A monitored weather and emergency alert system, as recited in claim 1,
    wherein said digital memory is nonvolatile flash memory.

6. A monitored weather and emergency alert system, as recited in claim 1,
    wherein said digital communications connection) is an Ethernet connection.

7. A monitored weather and emergency alert system, as recited in claim 1,
    wherein said remote computer is a server.

8. A monitored weather and emergency alert system, as recited in claim 1,
    wherein said remote computer is collocated, with said alert message decoder.

9. A monitored weather and emergency alert system, as recited in claim 1,
    wherein said remote computer is not collocated with said alert message decoder.

10. A monitored weather and emergency alert system, as recited in claim 1,
    wherein said digital weather and emergency alert messages are non-translated ASCII FIPS codes.

11. A monitored weather and emergency alert system, as recited in claim 10, wherein said digital weather and emergency alert messages comprise up to three bursts of the same non-translated ASCII FIPS codes.

12. A monitored weather and emergency alert system, as recited in claim 1,
    wherein said digital weather and emergency alert messages are analyzed and translated by said computer controller.

13. A monitored weather and emergency alert system, as recited in claim 1,
    wherein said digital, communications connection to said remote computer is initiated by a microcontroller within said digital communications connection.

14. A monitored weather and emergency alert system, as recited in claim 1,
    wherein said computer controller is a microcontroller.

15. A monitored weather and emergency alert system, as recited in claim 1,
    wherein said computer controller detects the reception of the last received new said digital weather and emergency alert message by a time period beginning with the detection of the first new said digital weather and emergency alert message.

16. A monitored weather and emergency alert system, as recited in claim 1,
    wherein said computer controller automatically sends each said digital weather and emergency alert message to said remote computer by TCP/IP.

17. A monitored weather and emergency alert system, as recited in claim 1, further comprising a filter to remove all non-ASCII characters from said digital weather and emergency alert message before analysis and translation of said digital weather and emergency alert message.

18. A monitored weather and emergency alert system, as recited in claim 1,
wherein said digital message on a timed basis consists of at least one ASCII character.

19. A monitored weather and emergency alert system, as recited in claim 1,
wherein said digital message on a timed basis contains data created by said computer controller describing the stares of said radio receiver, said alert message decoder, said computer controller and said digital, communications connection.

20. A monitored weather and emergency alert system, as recited in claim 1,
wherein said remote computer will attempt to reinitiate said digital communications connection if said remote computer does not receive said digital message on a timed basis.

21. A monitored weather and emergency alert system, as recited in claim 1,
wherein said remote computer will create an alert status message if said remote computer is not successful in reinitiating said digital communications connection upon said remote computer not receiving said digital message on a timed basis.

22. A monitored weather and emergency alert system, as recited in claim 1,
wherein said digital weather and emergency alert messages are analyzed and translated by said remote computer.

23. A monitored weather and emergency alert system, as recited in claim 1,
wherein said remote computer outputs said analyzed and translated digital weather and emergency alert messages by email.

24. A monitored weather and emergency alert system, as recited in claim 1,
wherein said remote computer outputs said analyzed and translated digital weather and emergency alert messages on web sites.

25. A monitored weather and emergency alert system, as recited in claim 1,
wherein said remote computer outputs said analyzed and translated digital weather and emergency alert messages into a log file.

26. A monitored weather and emergency alert system, as recited in claim 1,
wherein said remote computer outputs said analyzed and translated digital weather and emergency alert messages on printers.

27. A monitored weather and emergency alert system, as recited in claim 1,
wherein said remote computer outputs said analyzed and translated digital weather and emergency alert messages on LED signboards.

28. A monitored weather and emergency alert system, as recited in claim 24,
wherein said remote computer outputs said analyzed and translated digital weather and emergency alert messages on web sites, further comprising a web site comparison between said analyzed and translated digital weather and emergency alert messages and digital text alerts received digitally from the originator of said digital weather and emergency alert messages.

29. A monitored weather and emergency alert system, as recited in claim 24,
wherein said remote computer outputs said analyzed and translated digital weather and emergency alert messages on web sites, further comprising a web site comparison between said analyzed and translated digital weather and emergency alert messages and digital text alerts received digitally from the originator of said digital weather and emergency alert messages as part of weather forecast information.

30. A monitored weather and emergency alert system, as recited in claim 24,
wherein said remote computer outputs said analyzed and translated digital weather and emergency alert messages on web sites, further comprising a web site comparison between said analyzed and translated digital weather and emergency alert messages and digital text alerts received digitally from the originator of said digital weather and emergency alert messages as part of weather radar information.

31. A monitored weather and emergency alert system, as recited in claim 1,
wherein said remote computer outputs a status message describing the current status of the analysis of the receipt of said digital message on a timed basis.

32. A monitored weather and emergency alert system, as recited in claim 1,
wherein said remote computer outputs a status message describing the current status of the analysis of the receipt of said digital message on a timed basis to a web site.

33. A monitored weather and emergency alert system, as recited in claim 1,
wherein said remote computer analyzes and translates said digital weather and emergency alert message by parsing and comparing each logical text component of each burst of each said digital weather and emergency alert message.

34. A monitored weather and emergency alert system, as recited in claim 24,
wherein said remote computer outputs said analyzed and translated digital weather and emergency alert messages on web sites and where the remaining time of each said translated digital weather and emergency alert, message is calculated by said remote computer and is displayed on said web site.

35. A monitored weather and emergency alert system, as recited in claim 24,
wherein said remote computer outputs said analyzed and translated digital weather and emergency alert messages on websites and wherein the type of warning and warning status is color coded and is displayed on said web site.

36. A monitored weather and emergency alert system, as recited in claim 24,
further comprising streaming said radio receiver audio and wherein said streaming said radio receiver audio is accessible through said web site.

37. A monitored weather and emergency alert system, as recited in claim 36,
wherein said streaming said radio receiver audio and automatically mutes and unmutes with each new said digital weather and emergency alert messages through said web site.

38. A monitored weather and emergency alert system, as recited in claim 1, further comprising a professional weather station wherein the output of said professional weather station 1 readings are displayed on a web site.

39. A monitored weather and emergency alert system, as recited in claim 1, further comprising a camera wherein the output of said camera are displayed on a web site.

40. A monitored weather and emergency alert system, as recited in claim 1, wherein said remote computer outputs a status message describing the current status and update time: of each computer file used to display data on a web site.

41. A monitored weather and emergency alert system, as recited in claim 40, wherein said remote computer color codes a status message describing the current status and update time of each computer file used to display data on a web site.

42. A monitored weather and emergency alert system, as recited in claim 40, wherein said remote computer creates and outputs a status message describing the:

current status and update time of each computer file used to display data on a web site by email.

43. A monitored weather and emergency alert system, as recited in claim 1, wherein said remote computer creates mad outputs a status message wherein a web site value has exceeded a user set threshold.

44. A monitored weather and emergency alert system, as recited in claim 1, wherein said remote computer creates and outputs a status message wherein a web site value has exceeded a user set threshold wherein said stares message is output by email.

45. A monitored weather and emergency alert, system, as recited in claim 1, wherein said remote computer automatically reads and verifies an alert message and displays the email alert message on said web site.

\* \* \* \* \*